United States Patent [19]

McFarland

[11] 3,919,224
[45] Nov. 11, 1975

[54] ANTIBACTERIAL ACYLAMINOQUINOXALINECARBOXAMIDE 1,4-DIOXIDES

[75] Inventor: James W. McFarland, Lyme, Conn.

[73] Assignee: Pfizer Inc., New York, N.Y.

[22] Filed: Jan. 28, 1974

[21] Appl. No.: 437,132

[52] U.S. Cl. ........ 260/250 QN; 260/307 G; 424/250
[51] Int. Cl.² .................................. C07D 241/52
[58] Field of Search ........................... 260/250 Q

[56] References Cited
UNITED STATES PATENTS

| | | | |
|---|---|---|---|
| 2,626,259 | 1/1953 | Landquist et al. | 260/250 Q |
| 3,453,365 | 7/1969 | Lane et al. | 260/250 Q |
| 3,598,819 | 8/1971 | Stapley et al. | 260/250 Q |
| 3,660,398 | 5/1972 | Ley et al. | 260/250 R |

OTHER PUBLICATIONS

Durckheimer, Liebigs Ann. Chem. 756, 145-154 (1972).

*Primary Examiner*—Paul M. Coughlan, Jr.
*Assistant Examiner*—Mark L. Berch
*Attorney, Agent, or Firm*—Connolly and Hutz

[57] ABSTRACT

Certain novel 6(7)-acylaminoquinoxaline-2-carboxamide 1,4-dioxide derivatives, optionally bearing alkyl substituents on the carboxamide nitrogen atom, which are of value as antibacterial agents and as animal growth promotants.

6 Claims, No Drawings

ANTIBACTERIAL ACYLAMINOQUINOXALINECARBOXAMIDE 1,4-DIOXIDES

BACKGROUND OF THE INVENTION

1. Field of the Invention

This invention relates to certain novel chemical compounds which have useful antibacterial properties, and which are also of value by virtue of their growth promotant activity in animals. More specifically, these new chemical compounds are identified as derivatives of quinoxaline-2-carboxamide 1,4-dioxide, bearing an acylamino substituent on the fused benzo ring, and optionally bearing alkyl substituents on the carboxamide nitrogen atom.

2. Description of the Prior Art

Quinoxaline 1,4-dioxides are a well-known class of chemical compounds, some of which are reported to have antibacterial properties and/or to be useful as growth promoting agents in animals. U.S. Pat. No. 3,660,398 and British Pat. No. 1,308,370 both disclose quinoxaline-2-carboxamide 1,4-dioxides, and in particular, a variety of compounds carrying substituents at the 5, 6, 7 or 8 position are described. However, neither of the said patents discloses quinoxaline-2-carboxamide 1,4-dioxides with an acylamino substituent on the fused benzo ring. Landquist and Stacey in the *Journal of the Chemical Society* (London), 2822 (1953), reported the preparation of 6-acetamido-2,3-dimethylquinoxaline 1,4-dioxide, and, more recently, Dürckheimer in *Liebigs Annalen der Chemie*, 756, 145 (1972), describes the synthesis of ethyl 7-acetamido-3-methylquinoxaline-2-carboxylate 1,4-dioxide. British Pat. No. 1,237,438 discloses 5-acylaminoquinoxaline 1,4-dioxides, which, however, lack substituents in the pyrazino ring.

SUMMARY OF THE INVENTION

It is an object of the instant invention to provide novel quinoxaline 1,4-dioxides of formula:

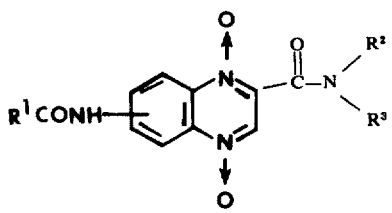

wherein
R$^1$CONH is a substituent at the 6 or the 7 position;
R$^1$ is alkyl having from one to three carbon atoms;
and R$^2$ and R$^3$ are each selected from the group consisting of hydrogen and alkyl having from one to four carbon atoms;
said quinoxaline 1,4-dioxides being of value as antibacterial agents and as growth promotants in animals.

A preferred group of quinoxaline 1,4-dioxides of this invention is the group of compounds of formula I, wherein R$^1$ is methyl; and especially valuable members of this series are the compounds of formula I, wherein R$^1$ is methyl and R$^2$ is hydrogen.

Compounds of the instant invention which are outstanding by virtue of their antibacterial activity and growth promoting properties in animals are the following congeners:

6(7)-acetamidoquinoxaline-2-carboxamide 1,4-dioxide,
6(7)-acetamido-N-methylquinoxaline-2-carboxamide 1,4-dioxide and
6(7)-acetamido-N-ethylquinoxaline-2-carboxamide 1,4-dioxide.

DETAILED DESCRIPTION OF THE INVENTION

As indicated hereinbefore, it is an object of this invention to provide novel and useful quinoxaline 1,4-dioxides of formula I. The said quinoxaline 1,4-dioxides can be synthesized readily and conveniently by a method now to be discussed and described in detail. This method comprises the reaction of a benzofurazan 1-oxide of formula II with a pyruvic acid ester and an amine of formula NHR$^2$R$^3$, wherein R$^1$, R$^2$ and R$^3$ are as previously defined.

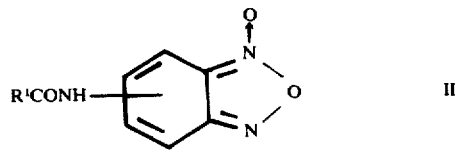

The reaction is normally carried out by contacting the reagents in an appropriate solvent system, at a temperature in the range from about 0° C. to about 100° C., and preferably in the range from about 20° C. to about 60° C. Appropriate solvents are those which will serve to dissolve at least two of the reactants, and will not adversely interact with either the starting reagents or the product. Examples of such solvents are aromatic hydrocarbons, such as benzene, toluene and xylene; ethers such as diethyl ether, tetrahydrofuran, dioxan and dialkyl ethers of ethylene glycol, propylene glycol and diethylene glycol; lower alkanols, such as methanol, ethanol and isopropanol; halogenated hydrocarbons, such as chloroform, methylene chloride and 1,2-dichloroethane; tertiary amides, such as N,N-dimethylformamide, N,N-dimethylacetamide and N-methylpyrrolidone; acetonitrile; and mixtures of these solvents.

The time course of the reaction varies according to a number of factors, such as the reactivity of the reagents, the concentrations of the reagents, the reaction solvent and the reaction temperature. As will be appreciated by one skilled in the art, the reaction proceeds more quickly at higher temperatures, and relatively short reaction times are used. At lower temperatures the reaction proceeds more slowly, and longer reaction times are required in order to achieve a good yield of product. Having full regard for these factors, when working at a temperature in the range from about 20° C. to about 60° C., reaction times of several hours, for example from about 2 hours to about 24 hours, are typically used. As will be further appreciated by one skilled in the art, when the amine component is of low reactivity, it is preferable to use relatively long reaction times and relatively high reaction temperatures.

The nature of the pyruvic acid ester is not critical; and it can be a substituted or unsubstituted alkyl, aryl, alicyclic or aralkyl ester. Representative examples of such esters are alkyl, phenyl, tolyl, halophenyl, nitrophenyl, alkoxyphenyl, cyclohexyl, cyclopentyl, naphthyl, benzyl and phenethyl esters. However, by virtue of their ready availability, preferred esters of pyruvic acid are those formed from straight-chain alkanols, having from one to 10 carbon atoms, for example methyl pyruvate, ethyl pyruvate and n-butyl pyruvate.

A wide variety of reactant ratios are operative in this process. However, it is usual to combine the benzofurazan 1-oxide and the pyruvic acid ester in substantially equimolar proportions, and then to employ at least one molar equivalent, and preferably more than one molar equivalent, of amine of formula $NHR^2R^3$. Although the detailed course of the reaction has not been elucidated, it is apparent that the stoichiometry of the reaction requires the combination of the benzofurazan 1-oxide component, the pyruvic acid ester and the amine of formula $NHR^2R^3$ in a 1:1:1 molar ratio, and also that the amine of formula $NHR^2R^3$ acts further as a reaction catalyst. When an excess of amine is used, excess amounts from as low as about 0.001 molar equivalents up to several molar equivalents, but usually about 0.1 molar equivalent, are used.

The products of the instant process are isolated from the reaction medium by standard methods. For example, in those instances where the product precipitates during the course of the reaction, it can be recovered simply by filtration. Alternatively, when the product does not precipitate spontaneously, it can often be induced to precipitate at the end of the reaction by dilution of the reaction medium with a non-solvent, such as hexane or water. A further method of product recovery involves removal of the solvents by evaporation, followed by partitioning of the crude product thus obtained between water and a water-immiscible organic solvent. After separation of the two phases, the product-containing phase is evaporated, to yield the product.

A variation which can be used in the method for the preparation of the compounds of formula I involves replacing the pyruvic acid ester and the amine of formula $NHR^2R^3$ by the corresponding pyruvamide of formula $CH_3COCONR^2R^3$. In this case, substantially equimolar amounts of the benzofurazan 1-oxide and the said pyruvamide are reacted in a solvent selected from those enumerated above; at a temperature in the range from about 0° C. to about 100° C., and preferably from about 20° C. to about 60° C.; for a period of several hours, usually from about 2 hours to about 24 hours; in the presence of a basic catalyst. A wide variety of basic catalysts can be used, and representative examples are ammonia; primary amines such as methylamine, ethylamine, butylamine, cyclohexylamine, aniline and benzylamine; secondary amines, such as diethylamine, dimethylamine, morpholine, piperidine, N-methylaniline and pyrrole; tertiary amines, such as triethylamine, N-methylmorpholine, N,N-dimethylaniline, pyridine and quinoline; alkoxides such as sodium methoxide, sodium ethoxide and potassium ethoxide; hydroxides, such as sodium, potassium and calcium hydroxide; and hydrides, such as sodium and potassium hydride. The amount of basic catalyst used is not critical, and amounts from as low as about 0.01 molar equivalents up to a several-fold molar excess, based on benzofurazan 1-oxide, can be used. The preferred amount is normally about 0.1 to 1.0 molar equivalents. The product quinoxaline 1,4-dioxides are then isolated by the same methods as described earlier.

The pyruvamides of formula $CH_3COCONR^2R^3$ are prepared either by reaction of an isocyanide of formula $R^2NC$ with acetyl chloride, followed by hydrolysis; or by the reaction of an amine of formula $NHR^2R^3$ with hydroxymaleic anhydride (Ugi and Fetzer, *Chemische Berichte*, 94, 1116 [1961]; Wohl and Lips, *Chemische Berichte*, 40, 2312 [1907]; and references cited therein).

A further variation which can be used in the preparation of the compounds of formula I involves utilizing a two-step procedure. In the first step of this two-step procedure, a benzofurazan 1-oxide of formula II reacts with a pyruvic acid ester of the type described earlier, in the presence of a basic catalyst, to produce an ester of the corresponding 6(7)-acylaminoquinoxaline-2-carboxylic acid 1,4-dioxide, in which the ester moiety is the same as the ester moiety of the pyruvate ester starting material. This first step is conducted in the same manner as described for the reaction of the benzofurazan 1-oxide with pyruvamide, and, in this case, appropriate basic catalysts are tertiary amines, such as triethylamine, tributylamine, N,N-dimethylaniline, N-methylmorpholine, pyridine and quinoline, metal hydroxides, such as sodium, potassium and calcium hydroxide, metal alkoxides, such as sodium methoxide, potassium methoxide and sodium ethoxide, and metal hydrides, such as sodium, potassium and calcium hydride. The second step of this two-step procedure is then carried out by treating the reaction medium containing the said quinoxaline-2-carboxylic acid ester 1,4-dioxide with about one molar equivalent, or, preferably, an excess, of an amine of formula $NHR^2R^3$. This second step commonly requires several hours, for example from about 2 hours to about 24 hours, at a temperature in the range from about 20°C. to about 120° C., and excesses of amine up to as high as 10 molar equivalents are commonly used. As will be realized by the skilled artist, the precise choice of conditions is made on the basis of such factors as the reaction concentration, the reactivity of the amine and the reactivity of the ester function. At the end of this second step, the product can be isolated by the methods of product isolation discussed above. In some instances the intermediate quinoxaline-2-carboxylic acid ester 1,4-dioxide is isolated and purified before the second step. However, this is not normally necessary.

The benzofurazan 1-oxides used in the preparation of the compounds of formula I are prepared by conventional methods. Thus, 5-acetamidobenzofurazan 1-oxide is prepared by monoacetylation of 1,4-diamino-2-nitrobenzene, followed by diazotization, treatment with sodium azide and pyrolysis, as taught by Boulton et al. in the *Journal of the Chemical Society*, London, Part C, 971 (1966). Repetition of this procedure, but with introduction of the appropriate acyl group into the starting 1,4-diamino-2-nitrobenzene, produces the other 5-acylaminobenzofurazan 1-oxides.

Although the acylaminobenzofurazan 1-oxides are referred to as the 5-isomers, they do in fact exist as dynamic tautomeric mixtures, which contain both the 5- and the 6-isomers, viz:

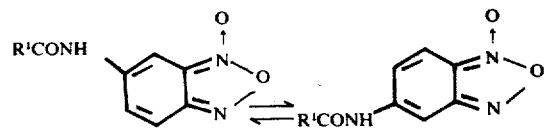

Moreover, because of the existence of this tautomeric equilibrium in the starting materials, the above-described method for the preparation of the compounds of formula I produces a mixture of 6- and 7- acylaminoquinoxaline 1,4-dioxides. The ratio of isomers obtained varies according to a number of factors, such as, for example, the structure of the reactants, the ability of the compounds to protect mice against a lethal challenge of *Streptococcus pyogenes*, or of *Escherichia coli*, is presented.

TABLE I.

| Compound | MIC's ($\mu$g./ml.) Strep. pyogenes | Esch. coli | Percentage protection* Strep. pyogenes SC | PO | Esch. coli SC |
|---|---|---|---|---|---|
| 6(7)-acetamido-quinoxaline-2-carboxamide 1,4-dioxide | 1.56 | 1.56 | 90 | 20 | 10 |
| 6(7)-acetamido-N-methylquinoxaline-2-carboxamide 1,4-dioxide | 1.56 | <0.39 | 100 | 90 | 20 |
| 6(7)-acetamido-N-ethylquinoxaline-2-carboxamide 1,4-dioxide | <0.39 | 3.12 | 90 | 100 | 20 |
| 6(7)-acetamido-N-n-propylquinoxaline-2-carboxamide 1,4-dioxide | 0.78 | 6.25 | 20 | 20 | 30 |
| 6(7)-acetamido-N-n-butylquinoxaline-2-carboxamide 1,4-dioxide | <0.39 | 12.5 | | | 20 |

*The dosage of test compound in the protection studies using Strep. pyogenes is 50 mg./kg. of body weight, and using Esch. coli it is 25 mg./kg. of body weight.

reaction temperature, the reaction solvent and the method chosen for product isolation. In some instances appreciable quantities of both isomers are obtained, whereas in other cases one isomer appears to predominate heavily. If desired, the mixture of the two isomers can be separated into its components by conventional means, such as, for example, fractional crystallization or chromatography. Identification of the isomers has not been completed in most instances, and the nomenclature used in this specification for the antibacterial quinoxaline 1,4-dioxides is intended to imply either the 6- or the 7-isomer, or a mixture thereof.

The in vitro antibacterial activity of the quinoxaline 1,4-dioxides of the instant invention can be demonstrated by the conventional two-fold serial dilution technique in Brain-Heart Infusion broth (Difco). The broth is inoculated with bacteria, and with the test quinoxaline 1,4-dioxide, and then it is incubated overnight under anaerobic conditions. On the next day, the test is read visually. The minimum inhibitory concentration (MIC) of test compound is the lowest concentration which prevents turbidity, i.e. which prevents growth of the microorganism. In vitro activities of a number of compounds of the instant invention are shown in Table I.

The quinoxaline 1,4-dioxides of this invention also show antibacterial activity in vivo. In determining such activity, the test compound is administered to mice which have been infected by intraperitoneal injection of a lethal inoculum of pathogenic bacteria. The test compound is administered using a multiple dosing regimen, and using either the oral (PO) or the subcutaneous (SC) route. The inoculum of bacteria varies from one to about ten times the amount needed to kill 100% of the mice, under the conditions of the test. At the end of the test, the activity of a compound is assessed by counting the number of survivors among the treated animals. Results are also given in Table I, wherein the The in vitro antibacterial activity of the quinoxaline 1,4-dioxides of this invention makes them valuable as industrial antimicrobials, for example in water treatment, slime control, paint preservation and wood preservation, as well as for topical application as disinfectants. In the case of use of these compounds for topical application, it is often covenient to admix the active ingredient with a non-toxic carrier, such as vegetable or mineral oil or an emollient cream. Similarly, it can be dissolved or dispersed in liquid diluents or solvents such as water, alkanols, glycols or mixtures thereof. In most instances it is appropriate to employ concentrations of active ingredients of from about 0.01 percent to about 10 percent by weight, based on total composition.

The in vivo activity of the quinoxaline 1,4-dioxide compounds of this invention makes them useful for the treatment of bacterial infections in animals, particularly in swine, cattle and poultry. When used in animals for these purposes, the compounds can be administered orally or parenterally, i.e., intramuscularly, subcutaneously or intraperitoneally, at a dosage of from about 1 mg./kg. of body weight to about 100 mg./kg. of body weight. However, in general, it will be found that a dosage in the range from about 5 mg./kg. of body weight to about 50 mg./kg. of body weight will suffice. The compounds can be administered alone, or they can be combined with various diluents and carriers, according to standard veterinary practice.

When parenteral use of the compounds of this invention is contemplated, they can be combined with vehicles such as water, isotonic saline, isotonic dextrose, Ringer's solution, or non-aqueous diluents such as vegetable oils (cotton seed oil, sesame oil, corn oil) or dimethylsulfoxide. Buffering agents, local anesthetics and/or inorganic salts are commonly added to afford desirable pharmacological properties.

In the case of oral use, the quinoxaline 1,4-dioxides of this invention can be combined with various diluents, including aqueous diluents, nonaqueous diluents and solid diluents, in the form of capsules, tablets, lozenges, troches, dry mixes, suspensions, solutions and dispersions.

A particularly valuable application of the compounds of this invention is as animal growth promotants. The addition of a low level of one or more of the herein described quinoxaline 1,4-dioxides to the diet of healthy animals, both ruminant and non-ruminant, such that these animals receive the product over an extended period of time, at a concentration of from about 1 ppm to about 100 ppm, and usually from about 5 ppm to about 50 ppm, blended with their feed, especially over a major portion of their active growth period, results in an acceleration of the rate of growth and improves feed efficiency (the number of pounds of feed required to produce a pound gain in weight). Examples of animals which can be treated in this way are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed. The quinoxaline 1,4-dioxides can be blended with the animal's feed, or they can be administered in an equivalent amount via the animal's water ration.

The following Examples are provided solely for the purpose of illustration.

EXAMPLE I

6(7)-Acetamidoquinoxaline-2-carboxamide 1,4-Dioxide

To a stirred solution of 0.966 g. (0.0050 mole) of 5-acetamidobenzofurazan 1-oxide and 0.602 g. (0.0051 mole) of ethyl pyruvate, in 25 ml. of acetonitrile, is added 1.0 ml. of 15N ammonium hydroxide solution, at ambient temperature. Stirring is continued overnight, and then the precipitate which has formed is filtered off to give 0.255 g. (16% yield) of 6(7)-acetamidoquinoxaline-2-carboxamide 1,4-dioxide, m.p. 210°–214° C. (dec.).

Analysis—Calc'd for $C_{11}H_{10}N_4O_4.3H_2O$ (percent): C, 41.8; H, 5.1; N, 17.7. Found (percent): C, 41.3; H, 4.2; N, 18.1.

EXAMPLE II

When the procedure of Example I is repeated, except that the 5-acetamidobenzofurazan 1-oxide used therein is replaced by an equimolar amount of 5-propionamidobenzofurazan 1-oxide, 5-n-butyramidobenzofurazan 1-oxide and 5-isobutyramidobenzofurazan 1-oxide, respectively, there is produced:

6(7)-propionamidoquinoxaline-2-carboxamide 1,4-dioxide,
6(7)-n-butyramidoquinoxaline-2-carboxamide 1,4-dioxide and
6(7)-isobutyramidoquinoxaline-2-carboxamide 1,4-dioxide, respectively.

EXAMPLE III

6(7)-Acetamido-N-methylquinoxaline-2-carboxamide 1,4-Dioxide

To a stirred solution of 0.996 g. (0.0050 mole) of 5-acetamidobenzofurazan 1-oxide and 0.602 g. (0.0051 mole) of ethyl pyruvate, in a mixture of 25 ml. of acetonitrile and 7 ml. of dichloromethane, is added 2.3 ml. of a 4.78N solution of methylamine in methanol, at ambient temperature. Stirring is continued overnight, and then the precipitated solid is filtered off to furnish 0.375 g. of 6(7)-acetamido-N-methylquinoxaline-2-carboxamide 1,4-dioxide, m.p. 254°–255° C. (dec.). A second crop of product (0.170 g.) with m.p. 259°–260° C. (dec.) is obtained from the filtrate. The total yield is therefore 0.545 g. (38% yield).

Analysis—Calc'd for $C_{12}H_{12}N_4O_4.0.5\ H_2O$ (percent): C, 50.5; H, 4.6; N, 19.6. Found (percent): C, 50.1; H, 4.4; N, 19.1.

EXAMPLE IV

Reaction of 5-acetamidobenzofurazan 1-oxide, ethyl pyruvate and the appropriate amine, according to the procedure of Example III, provides the following analogs:

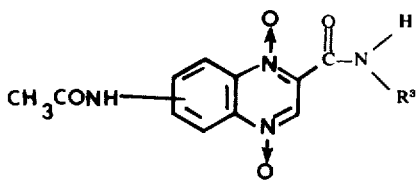

| R³ | m.p. (°C.) | Calc'd (%) C | H | N | Found (%) C | H | N |
|---|---|---|---|---|---|---|---|
| CH₂CH₃ | 247–248 | 53.8 | 4.9 | 19.3 | 53.7 | 4.9 | 19.3 |
| CH₂CH₂CH₃ | 247–248 | 55.3 | 5.3 | 18.4 | 55.1 | 5.3 | 18.6 |
| CH₂CH₂CH₂CH₃ | 249–250 | 56.6 | 5.7 | 17.6 | 56.4 | 5.7 | 17.5 |

EXAMPLE V

Reaction of the appropriate 5-acylaminobenzofurazan 1-oxide with ethyl pyruvate and the requisite amine, in a manner analogous to the procedure of Example III, affords the following analogs:

6(7)-acetamido-N-isopropylquinoxaline-2-carboxamide 1,4-dioxide,
6(7)-acetamido-N,N-dimethylquinoxaline-2-carboxamide 1,4-dioxide,
6(7)-acetamido-N,N-diethylquinoxaline-2-carboxamide 1,4-dioxide,
6(7)-acetamido-N,N-di-n-butylquinoxaline-2-carboxamide 1,4-dioxide,
6(7)-acetamido-N-ethyl-N-methylquinoxaline-2-carboxamide 1,4-dioxide,
6(7)-propionamido-N-methylquinoxaline-2-carboxamide 1,4-dioxide,
6(7)-propionamido-N-isobutylquinoxaline-2-carboxamide 1,4-dioxide,
6(7)-propionamido-N,N-dimethylquinoxaline-2-carboxamide 1,4-dioxide,
6(7)-propionamido-N,N-di-n-propylquinoxaline-2-carboxamide 1,4-dioxide,
6(7)-n-butyramido-N-methylquinoxaline-2-carboxamide 1,4-dioxide,
6(7)-n-butyramido-N-n-propylquinoxaline-2-carboxamide 1,4-dioxide,
6(7)-n-butyramido-N,N-diethylquinoxaline-2-carboxamide 1,4-dioxide,
6(7)-n-butyramido-N-methyl-N-n-propylquinoxaline-2-carboxamide 1,4-dioxide,
6(7)-isobutyramido-N-ethylquinoxaline-2-carboxamide 1,4-dioxide, 6(7)-isobutyramido-N-sec-butylquinoxaline-2-carboxamide 1,4-dioxide,
6(7)-isobutyramido-N,N-dimethylquinoxaline-2-carboxamide 1,4-dioxide and
6(7)-isobutyramido-N-n-butyl-N-methylquinoxaline-2-carboxamide 1,4-dioxide,
respectively.

What is claimed is:
1. A compound of formula:

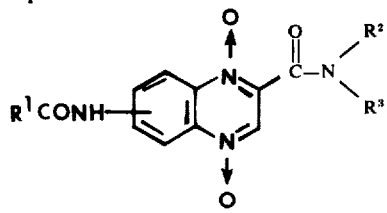

wherein
$R^1CONH$ is a substituent at the 6 or the 7 position;
$R^1$ is alkyl having from one to three carbon atoms;
and $R^2$ and $R^3$ are each selected from the group consisting of hydrogen and alkyl having from one to four carbon atoms.
2. A compound according to claim 1, wherein $R^1$ is methyl.
3. A compound according to claim 2, wherein $R^2$ is hydrogen.
4. A compound according to claim 3, wherein $R^3$ is hydrogen.
5. A compound according to claim 3, wherein $R^3$ is methyl.
6. A compound according to claim 3, wherein $R^3$ is ethyl.

* * * * *